US011312011B2

(12) United States Patent
Sugiyama et al.

(10) Patent No.: US 11,312,011 B2
(45) Date of Patent: Apr. 26, 2022

(54) MANIPULATOR SYSTEM, CONTROL DEVICE, CONTROL METHOD, AND COMPUTER PROGRAM PRODUCT

(71) Applicant: Kabushiki Kaisha Toshiba, Minato-ku (JP)

(72) Inventors: Nobukatsu Sugiyama, Kawasaki (JP); Yoshiyuki Ishihara, Kawasaki (JP); Junji Oaki, Kawasaki (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 887 days.

(21) Appl. No.: 16/107,183

(22) Filed: Aug. 21, 2018

(65) Prior Publication Data
US 2019/0262991 A1    Aug. 29, 2019

(30) Foreign Application Priority Data

Feb. 28, 2018    (JP) .............................. JP2018-035731

(51) Int. Cl.
*B25J 9/16*        (2006.01)
*B25J 9/06*        (2006.01)

(52) U.S. Cl.
CPC .......... *B25J 9/1607* (2013.01); *B25J 9/1666* (2013.01); *B25J 9/1697* (2013.01); *B25J 9/06* (2013.01)

(58) Field of Classification Search
CPC ...... B25J 9/1607; B25J 9/1697; B25J 9/1666; B25J 9/06; B25J 9/1676
See application file for complete search history.

(56) References Cited

U.S. PATENT DOCUMENTS

| 5,430,643 A | * | 7/1995 | Seraji | ..................... B25J 9/1643 318/568.11 |
| 7,849,629 B1 | * | 12/2010 | Adcock | .................. A01K 91/10 43/15 |
| 2007/0146371 A1 | * | 6/2007 | Dariush | ................. B25J 9/1602 345/474 |
| 2009/0118863 A1 | * | 5/2009 | Dariush | ................. B25J 9/1666 700/255 |

(Continued)

FOREIGN PATENT DOCUMENTS

| JP | 63-150183 | 6/1988 |
| JP | 5-119823 | 5/1993 |

(Continued)

OTHER PUBLICATIONS

Kanehiro, F. et al. "Integrating Geometric Constraints into Reactive Leg Motion Generation", Intelligent Robots and Systems (IROS), 2010, 8 pages.

*Primary Examiner* — Masud Ahmed
(74) *Attorney, Agent, or Firm* — Oblon, McClelland, Maier & Neustadt, L.L.P.

(57) ABSTRACT

A manipulator system according to an embodiment includes a manipulator, an actuator, and a control device. The actuator is configured to operate the manipulator. The control device is configured to control the actuator so that the manipulator moves while avoiding an obstacle. The control device controls the actuator so that an angle between a moving velocity vector of a first target point on the manipulator and a normal vector at a second target point on a surface of the obstacle is within 90°.

8 Claims, 7 Drawing Sheets

(56) References Cited

U.S. PATENT DOCUMENTS

| | | | |
|---|---|---|---|
| 2016/0113728 A1* | 4/2016 | Piron | A61B 5/0062 |
| | | | 606/130 |
| 2017/0120449 A1* | 5/2017 | Matsunami | B25J 9/1671 |
| 2019/0084152 A1* | 3/2019 | Deacon | B25J 9/1612 |
| 2019/0143525 A1* | 5/2019 | Ishihara | G05B 19/00 |
| | | | 700/59 |

FOREIGN PATENT DOCUMENTS

| | | |
|---|---|---|
| JP | 2012-11498 | 1/2012 |
| JP | 5261495 | 8/2013 |
| JP | 2014-18912 | 2/2014 |
| JP | 2014-24162 A | 2/2014 |
| JP | 2015-174185 | 10/2015 |
| JP | 2018-1348 A | 1/2018 |
| JP | 2019-89188 A | 6/2019 |

\* cited by examiner

MANIPULATOR SYSTEM, CONTROL DEVICE, CONTROL METHOD, AND COMPUTER PROGRAM PRODUCT

CROSS-REFERENCE TO RELATED APPLICATIONS

This application is based upon and claims the benefit of priority from Japanese Patent Application No. 2018-035731, filed on Feb. 28, 2018; the entire contents of which are incorporated herein by reference.

FIELD

Embodiments described herein relate generally to a manipulator system, a control device, a control method, and a computer program product.

BACKGROUND

Conventionally, a manipulator system that moves an end effector to a target position has been known.

In this sort of manipulator system, it is meaningful if it is possible to obtain a more improved manipulator system that can move while avoiding an obstacle, for example.

DETAILED DESCRIPTION

A manipulator system according to an embodiment includes a manipulator, an actuator, and a control device. The actuator is configured to operate the manipulator. The control device is configured to control the actuator so that the manipulator moves while avoiding an obstacle. The control device controls the actuator so that an angle between a moving velocity vector of a first target point on the manipulator and a normal vector at a second target point on a surface of the obstacle is within 90°.

The following discloses exemplary embodiments of a manipulator system. The configurations and control (technical features) in the following embodiments exemplified, as well as the operation and results (effects) that are brought about by such configurations and control, are mere examples.

The following embodiments and a modification include the same constituent elements. In the following description, those same constituent elements may be denoted by common reference signs and the redundant explanations thereof may be omitted. Furthermore, in the present disclosure, ordinal numbers are given to distinguish constituent elements or the like for the sake of convenience, and are not intended to indicate the order of priority or sequence.

First Embodiment

Manipulator System

Figure 1:
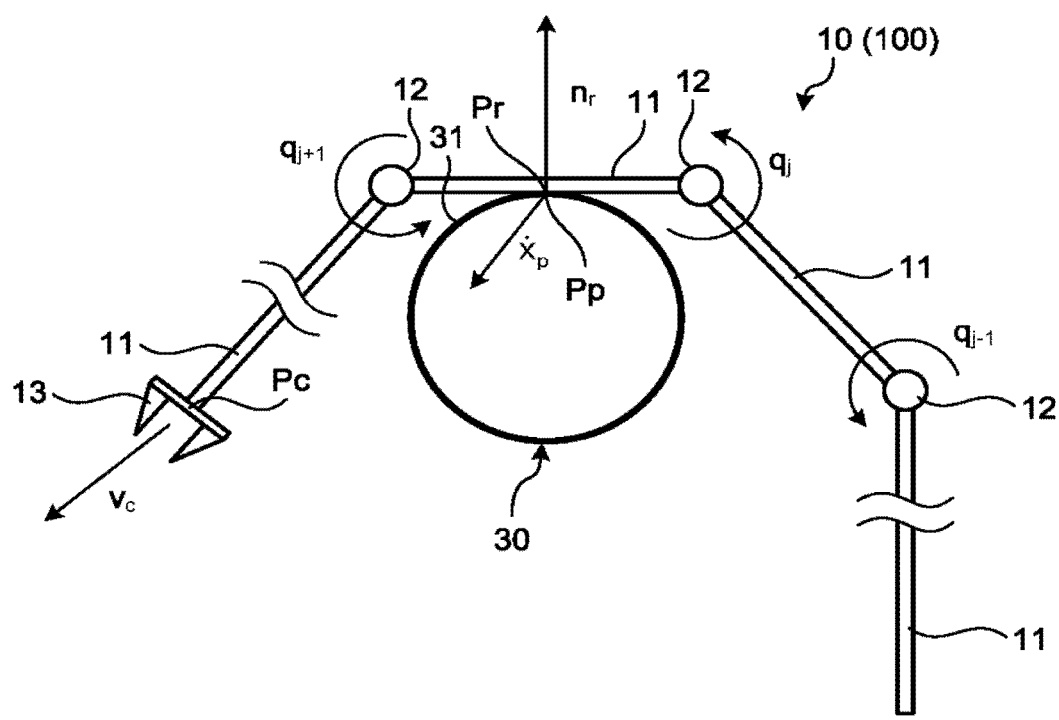
FIG. 1 is a schematic and exemplary configuration diagram of a manipulator according to an embodiment.

FIG. 1 is a configuration diagram of a manipulator 10. The manipulator 10 constitutes a manipulator system 100 together with a control device 20 not depicted in FIG. 1 (see FIG. 2). The manipulator 10 can be referred to as a robot arm.

The manipulator 10 is configured as what is called an articulated arm in which a plurality of arms 11 are rotatively coupled at joints 12. The control device 20 changes, by controlling the operation of actuator 14 not depicted in FIG. 1 (see FIG. 2), an angle between two arms 11 at each joint 12, thereby changing the position and posture of the manipulator 10. The joint 12 is a rotational joint, ball joint, or the like, for example. The manipulator 10 may include a prismatic joint.

The manipulator 10 has an end effector 13 at the distal end thereof. A control target point Pc by the control device 20 is set, for example, on the end effector 13.

The control device 20 controls the actuator 14 such that the control target point Pc is in a predetermined position and posture. The control target point Pc may be one point or a plurality of points, and may be set not on the end effector 13.

The actuator 14 changes the angle between two arms 11 at least one joint 12. The actuator 14 is driven by an electric control signal that the control device 20 generates. The actuator 14 is a motor, an artificial muscle, or the like, for example.

In addition, although described in detail later, the control device 20 controls the actuator 14 so that the manipulator 10 will not interfere with an obstacle 30, in other words, so that a constraint condition of interference avoidance is satisfied. In the first embodiment, the control device 20 controls the actuator 14 so that an angle between a moving velocity vector $dx_p/dt$ of a first target point Pp of the manipulator 10 and a normal vector $n_r$ at a second target point Pr on a surface 31 of the obstacle 30 is within 90°. Accordingly, it is possible to restrain the first target point Pp from getting close to the second target point Pr and the surface 31, and eventually, it is possible to restrain the manipulator 10 from making contact with the obstacle 30. The constraint condition of interference avoidance is one example of a first constraint condition.

The first target point Pp and the second target point Pr are target points for which the constraint condition of interference avoidance is set, and can be set based on the relative position and posture between the obstacle 30 and the manipulator 10, for example. As for the first target point Pp, a point on the end effector 13 or a point on the joint 12 can be selected, for example. In addition, as the first target point Pp, an intermediate position between both ends of any one of the arms 11, in other words, a center position between two joints 12 interposing the arm 11, may be selected, for example.

As for the first target point Pp, one point may be selected, or a plurality of points may be selected. Furthermore, as for the first target point Pp, as one example, a point at which the probability of interfering with the obstacle 30 is high is selected, and does not necessarily coincide with the control target point Pc. As the second target point Pr, one point on the surface 31 may be selected, or a plurality of points on the surface 31 may be selected. In FIG. 1, although the first target point Pp and the second target point Pr are depicted in a state of being in contact, in the actual interference avoidance control, the control device 20 controls the actuator 14 so that the first target point Pp and the second target point Pr do not come in contact. In this case, for not making the first target point Pp and the second target point Pr come in contact more reliably, a distance condition such as a margin in distance between the first target point Pp and the second target point Pr, a lower limit of distance between the first target point Pp and the second target point Pr, or the like may be set. In addition, a distance condition in which the distance with respect to a virtual obstacle for which the obstacle 30 is expanded by a height that is equivalent to a margin in distance from the surface 31 is 0 or more may be set.

Control Device and Control Method

Figure 2:
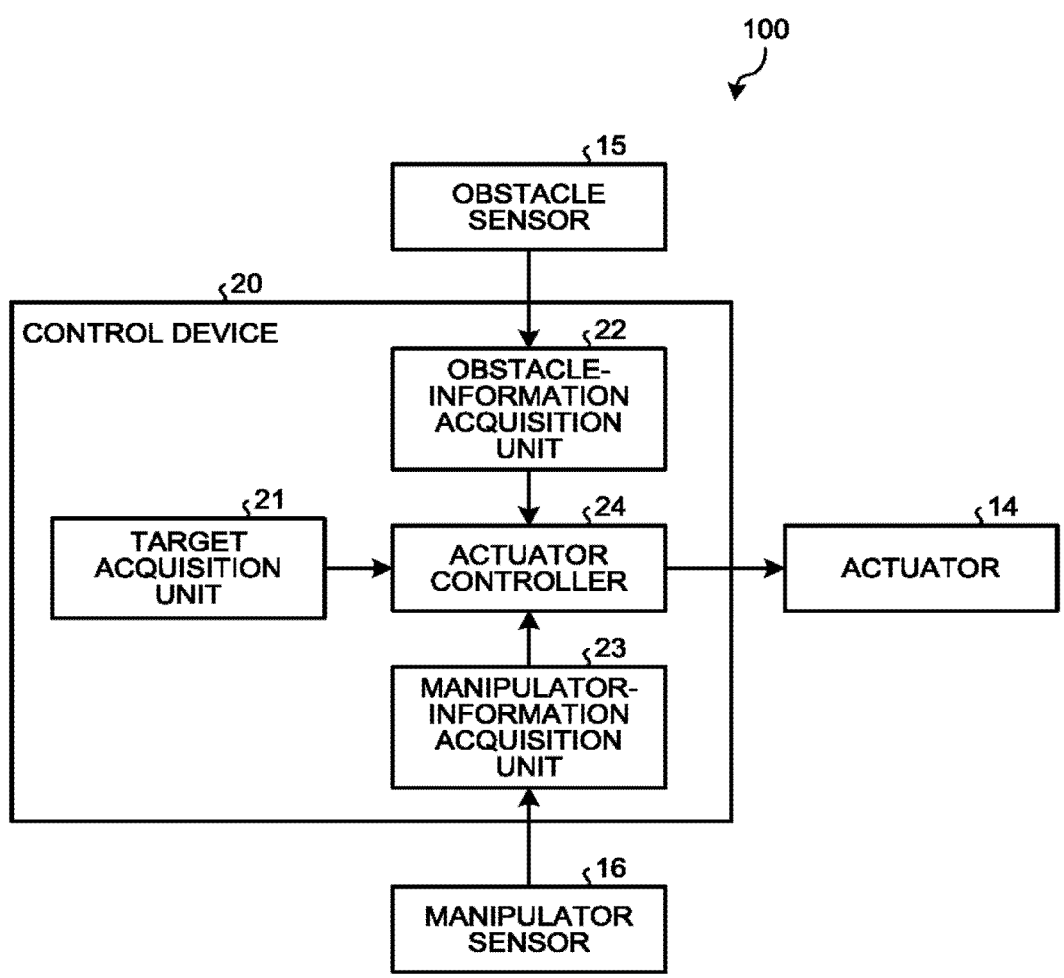
FIG. 2 is a schematic and exemplary block diagram of a control device of the embodiment.

FIG. 2 is a block diagram of the control device 20. As illustrated in FIG. 2, the control device 20 includes a target acquisition unit 21, an obstacle-information acquisition unit 22, a manipulator-information acquisition unit 23, and an actuator controller 24.

The target acquisition unit 21 acquires target information on the control target point Pc. The target information is velocity or angular velocity of the control target point Pc at a subsequent step (time step), for example. The target information is predetermined, for example, and in that case, the target acquisition unit 21 can acquire the target information from a non-depicted storage unit that the control device 20 has.

The obstacle-information acquisition unit 22 acquires obstacle information on the obstacle 30 to avoid, within a range that the manipulator 10 operates. The obstacle information is information indicating position, shape, and the like of the surface 31 of the obstacle 30, for example. The obstacle-information acquisition unit 22 can acquire the obstacle information from an obstacle sensor 15 such as an RGB-D sensor, a camera, a contact sensor, and a distance sensor. The obstacle-information acquisition unit 22 may acquire the obstacle information from a database that holds known obstacle information beforehand, a light detection and ranging (LIDAR), a laser imaging detection and ranging (LiDAR), and the like.

The manipulator-information acquisition unit 23 acquires manipulator information. The manipulator information is information indicating the position and posture of the manipulator 10, and is an angle at each joint 12, for example. The manipulator-information acquisition unit 23 can acquire the manipulator information from a manipulator sensor 16 such as a rotary encoder, a camera, an angle sensor, and a distance sensor.

The actuator controller 24 calculates an optimal solution of move with respect to the target information on the control target point Pc, with a constraint condition that the manipulator 10 and the obstacle 30 do not interfere with, based on the target information, the obstacle information, and the manipulator information. Then, the actuator controller 24 controls the actuator 14 so that the manipulator 10 moves along the optimal solution.

Figure 3:
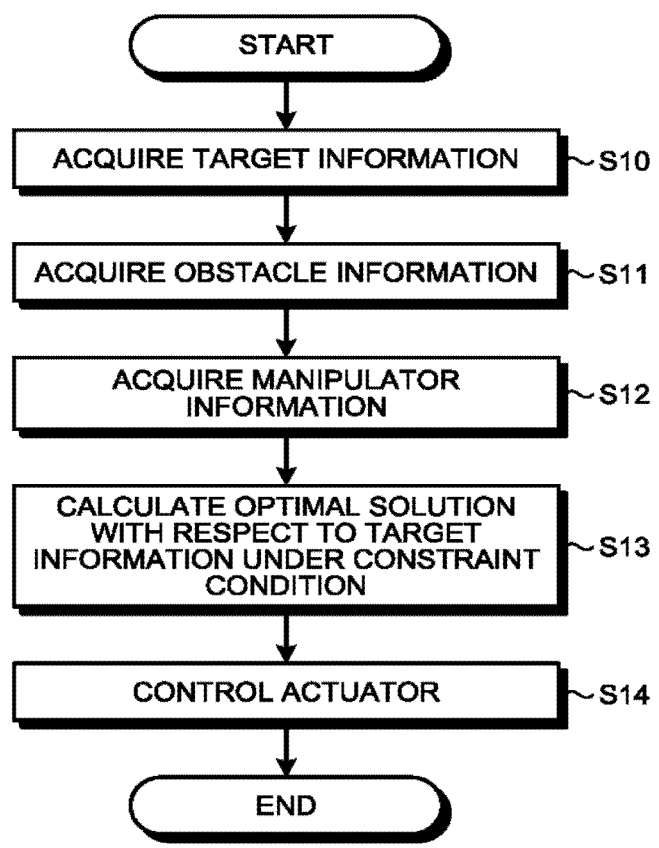
FIG. 3 is a schematic and exemplary flowchart illustrating a control procedure performed by the control device of the embodiment.

FIG. 3 is a flowchart illustrating a control procedure performed by the control device 20. As illustrated in FIG. 3, in the control device 20, the target acquisition unit 21 acquires the target information (S10), the obstacle-information acquisition unit 22 acquires the obstacle information (S11), and the manipulator-information acquisition unit 23 acquires the manipulator information (S12). In the sequence in FIG. 3, the order of S10 to S12 may be swapped. Then, the actuator controller 24 calculates the optimal solution of the move with respect to the target information on the control target point Pc under the constraint condition of interference avoidance (S13), and controls the actuator so that the manipulator 10 moves along the optimal solution (S14).

The arithmetic processing and control by the control device 20 may be executed by software or may be executed by hardware. The arithmetic processing and control by the control device 20 may include the arithmetic processing and control by software and the arithmetic processing and control by hardware. In a case of processing by software, the control device 20 reads out and executes a program (application) stored in a recording medium (storage medium) such as a ROM, an HDD, an SSD, a flash memory, and the like. The control device 20 functions, by operating in accordance with the program, as each of the units included in the control device 20, that is, the target acquisition unit 21, the obstacle-information acquisition unit 22, the manipulator-information acquisition unit 23, the actuator controller 24, and others. In this case, the program includes modules corresponding to the above-described various units.

The program can be provided in a file of an installable format or of an executable format recorded on a computer readable recording medium, such as a CD-ROM, an FD, a CD-R, a DVD, and a USB memory. The program can be stored in a storage unit of a computer connected to a communication network, and implemented by being downloaded via the network. The program may be embedded in a ROM or the like in advance.

Furthermore, when at least a part of the control device 20 is made up of hardware, in the control device 20, a field-programmable gate array (FPGA), an application-specific integrated circuit (ASIC), or the like can be included.

Optimization Problem with Constraint Condition

Next, the arithmetic processing and control that the actuator controller 24 executes will be described.

By assuming that the degree of freedom of the manipulator 10 is n, each joint angle indicating the degree of freedom of the manipulator 10 is expressed by a vector $q=[q_1, q_2, q_3, \ldots, q_n]^T$.

It is assumed that a target velocity of the control target point Pc at the next step that is obtained from the target acquisition unit 21 is $v_c$. This includes a velocity vector that determines a three-dimensional position at the control target point Pc, and an angular velocity that determines the posture at the control target point Pc. When the obstacle 30 is not considered, by using the following Expression (1) including a Jacobian matrix $J_c(q)$ at the control target point Pc, the transformation from a three-dimensional space of the arithmetic processing into a joint angle space is possible:

$$\dot{q} = J_c(q)^+ v_c \qquad (1)$$

where $\dot{q}$ is a vector indicating the joint angular velocity, and $J_c(q)^+$ indicates a pseudo-inverse matrix of $J_c(q)$ (inverse matrix, if the Jacobian matrix is a square matrix). Accordingly, as for an optimization problem in which the control target point Pc moves to follow the target information as much as possible, it is only necessary to derive the solution of a least squares problem that can be expressed by the following Expression (2).

$$\min_{\dot{q}} \tfrac{1}{2} \| J_c(q)\dot{q} - v_c \|^2 \qquad (2)$$

When there are a plurality of (k pieces) control points Pc, by configuring an augmented matrix system as the following Expression (3) by using the corresponding Jacobian matrix and the target information, it is possible to calculate the joint angular velocity.

$$J_c = [J_{c1}^T, J_{c2}^T, \ldots, J_{ck}^T]^T$$

$$v_c = [v_{c1}^T, v_{c2}^T, \ldots, v_{ck}^T]^T \qquad (3)$$

The Jacobian matrix is a matrix that represents the relation between the change in the joint angle of the manipulator 10, and the velocity and angular velocity of the first target point Pp on the manipulator 10. The Jacobian matrix $J_a$ at a certain point a (three-dimensional coordinate is defined as $x_a$) on the manipulator 10 can be expressed as the following Expression (4):

$$J_a = \begin{bmatrix} z_1 \times (x_a - r_1) & z_2 \times (x_a - r_2) & \ldots & z_n \times (x_a - r_n) \\ z_1 & z_2 & \ldots & z_n \end{bmatrix} \qquad (4)$$

where a vector of a rotation axis of a joint $q_i$ was defined as $z_1$, and the center coordinate of the joint was defined as $r_i$. In this Jacobian matrix $J_a$, the upper row represents the relation of positions, and the lower row represents the relation of postures.

When the distance between the first target point Pp on the manipulator 10 and the second target point Pr on the obstacle 30 is close to a lower limit, the manipulator 10 needs to avoid the obstacle 30 by the following operation. The distance to the obstacle 30 can be calculated from the obstacle information, and a joint angle in the manipulator information. It is assumed that the outward normal vector $n_r$ at the second target point Pr on the obstacle 30 has been acquired from the obstacle information.

The arithmetic processing of the constraint condition of interference avoidance can be executed on two points (the first target point Pp and the second target point Pr) for which the distance is the closest, two points for which the distance is predicted to be the closest, or a plurality of combinations of such two points. The selection of the first target point Pp and the second target point Pr that are the subjects of arithmetic processing, and the calculation of the distance, which is the criterion of the selection, between the first target point Pp and the second target point Pr can be executed by using a known collision detection method such as Boblow method, Lin-Canny method, and Gilbert method in which the calculation is made after the arm 11 of the manipulator 10 and the obstacle 30 are approximated by shapes that are easy to calculate such as a circular cylinder and a rectangular parallelepiped.

The inner product of the position-velocity vector
$$\dot{x}_p$$
of the first target point Pp at the next step and the normal vector $n_r$ at the second target point Pr on the surface 31 of the obstacle 30 can be expressed by the following Expression (5):

$$n_p^T \dot{x}_p = \|n_p\| \|\dot{x}_p\| \cos \alpha_p \qquad (5)$$

where $\alpha_p$ is an angle formed by the two vectors. If the $\alpha_p$ is in a range equal to or greater than $-90°$ and equal to or less than $90°$, it can be considered that the first target point Pp moves in a direction that the obstacle 30 is not present. In other words, if the following Expression (6) is satisfied, in the next step, the first target point Pp does not make contact with the second target point Pr, and at this region, the manipulator 10 does not interfere with the obstacle 30:

$$n_p^T \dot{x}_p = n_p^T J_{Bp}(q) \dot{q} \geq 0 \qquad (6)$$

where $J_{Bp}(q)$ is a Jacobian matrix only for a position at the first target point Pp on the manipulator 10 of 3×n.

When the calculation on a plurality of (m pieces) combinations of the first target point Pp and the second target point Pr is made, it is only necessary to use an augmented matrix as in the following Expression (7).

$$n = [n_{p1}^T, n_{p2}^T, \ldots, n_{pm}^T]^T$$

$$J_B(q) = [J_{Bp1}^T(q), J_{Bp2}^T(q), \ldots, J_{Bpm}^T(q)]^T$$

$$n^T J_B(q) \dot{q} \geq 0 \qquad (7)$$

The actuator controller 24 calculates the optimal solution of the move with respect to the target information on the control target point Pc indicated by Expression (2) while satisfying the constraint condition of interference avoidance indicated by Expression (6). That is, the actuator controller 24 calculates the optimal solution of a linear least-squares problem with a constraint condition as indicated by the following Expression (8).

$$\min_{\dot{q}} \tfrac{1}{2} \|J_c(q)\dot{q} - v_c\|^2 \; s.t. \; n^T J_B(q) \dot{q} \geq 0 \qquad (8)$$

Such a linear least-squares problem with a constraint condition can be solved at a high speed by interior point method, active set method, and the like. Furthermore, it is also possible to add upper and lower limits of the joint angle, upper and lower limits of the joint angular velocity, and the like to the constraint condition, and it can be said that such a method is a highly scalable method.

Figure 4:
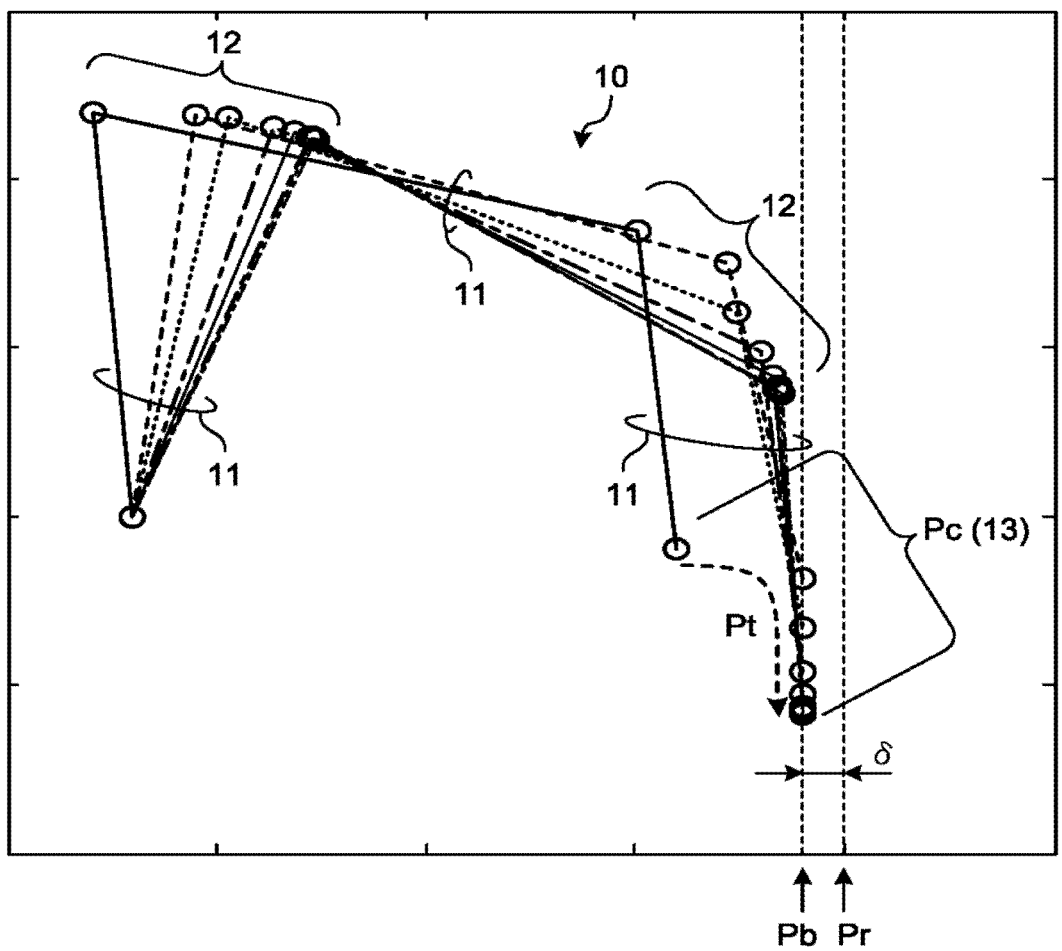
FIG. 4 is a schematic and exemplary diagram illustrating variations with time in the position and posture of the manipulator that moves by the control of an actuator performed by an actuator controller of a first embodiment.

FIG. 4 is a diagram illustrating variations with time in the position and posture of the manipulator 10 that moves by the control of the actuator 14 performed by the actuator controller 24. By referring to FIG. 4, it can be understood that, in moving the control target point Pc set on the end effector 13 along a track Pt so as to follow the target information as much as possible, the control target point Pc moves in a state that the manipulator 10 is away from the second target point Pr as a whole by a distance δ (margin), that is, in a state that the manipulator 10 does not interfere with the second target point Pr. In the example in FIG. 4, the first target point Pp also is set on the end effector 13. A third target point Pb is a virtual target point (surface of a virtual obstacle) projecting outward of the surface 31 by the distance δ from the second target point Pr, and the actuator controller 24 can solve the above-described optimization problem under a constraint condition that the distance to the third target point Pb on the surface of the virtual obstacle is 0 or more, or more than 0.

As in the foregoing, in the first embodiment, the control device 20 controls the actuator 14 so that an angle between the moving velocity vector of the first target point Pp of the manipulator 10 and the normal vector at the second target point Pr on the surface 31 of the obstacle 30 is within 90°. According to such a configuration, the control device 20 can cause the manipulator 10 to operate without interfering with the obstacle 30, for example.

In addition, in the first embodiment, the control device 20 controls the actuator 14 by, based on the Jacobian matrix at the first target point Pp and the normal vector at the second target point Pr of the surface 31, solving an optimization problem of the target operation of the control target point Pc of the manipulator 10 with a constraint condition including the first constraint condition in which the inner product of the moving velocity vector and the normal vector is 0 or more. With such a configuration, the control device 20 can cause the manipulator 10 to operate such that the control target point Pc moves to follow its target information as much as possible without interfering with the obstacle 30, for example.

Furthermore, in the first embodiment, the optimization problem is a problem to optimize the operation of the actuator 14 with respect to the predetermined target operation of the control target point Pc. According to the first embodiment, the control device 20 can cause the manipulator 10 to operate such that the control target point Pc moves to follow the predetermined target information as much as possible while satisfying the constraint condition.

First Modification

Figure 5:
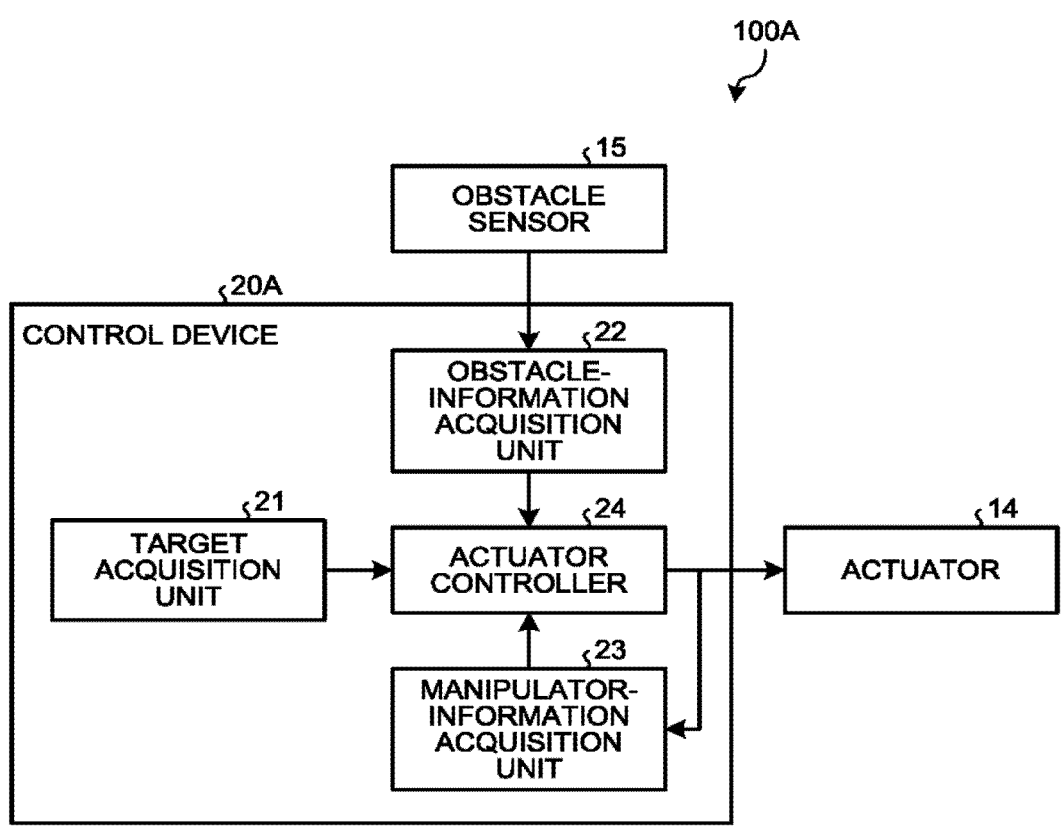
FIG. 5 is a schematic and exemplary block diagram of a control device of a first modification of the first embodiment.

FIG. 5 is a block diagram of a control device 20A of a first modification. In a manipulator system 100A of the first modification, the manipulator-information acquisition unit 23 of the control device 20A acquires the manipulator information from the arithmetic processing result of the actuator controller 24. Specifically, the manipulator-information acquisition unit 23 can acquire the angle of each joint 12 by obtaining from the actuator controller 24 an angular velocity of each joint 12 calculated by the actuator controller 24, and by integrating the angular velocity.

Thus, according to the first modification, by the manipulator system 100A of a simpler configuration having no manipulator sensor 16, it is possible to obtain the same effect as that of the above-described first embodiment.

Second Embodiment

Figure 6:
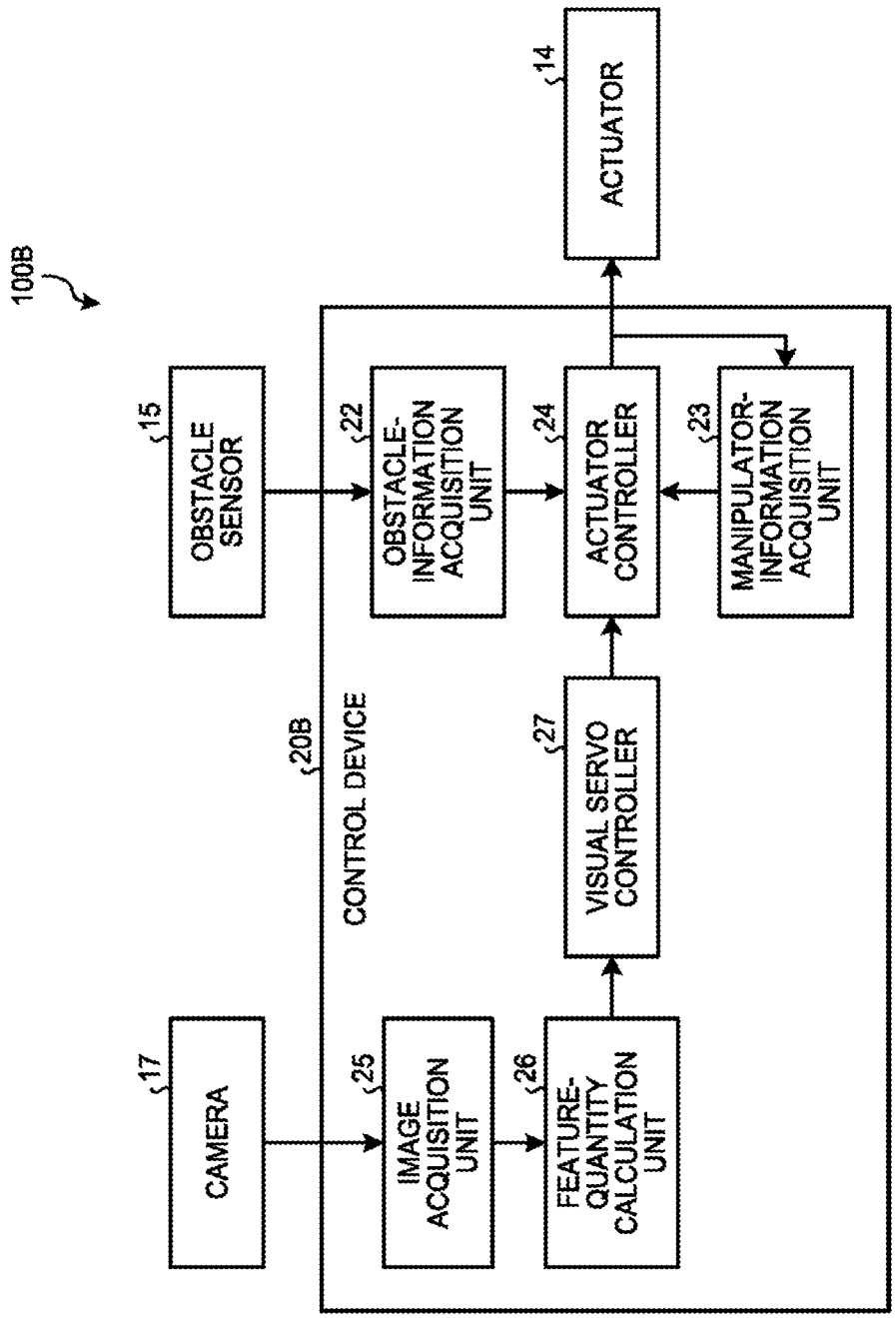
FIG. 6 is a schematic and exemplary block diagram of a control device according to a second embodiment.

FIG. 6 is a block diagram of a control device 20B according to a second embodiment. In a manipulator system 100B of the second embodiment, the control device 20B causes the control target point Pc to move to the target position by visual servo control based on an image of a camera 17. Thus, the control device 20B includes an image acquisition unit 25, a feature-quantity calculation unit 26, and a visual servo controller 27.

The camera 17 is an image sensor having a photoelectric conversion element, optical system components, and the like, and is an area sensor, RGB-D sensor, or the like, for example. The camera 17 is attached to the end effector 13 of the manipulator 10 or to a part fixed to the end effector 13, for example.

The image acquisition unit 25 acquires an image of a target photographed by the camera 17.

The feature-quantity calculation unit 26 calculates a feature quantity indicating the feature of the target object by image processing from image data acquired by the image acquisition unit 25.

The visual servo controller 27 calculates a vector $v_c$ indicating the velocity and acceleration of the control target point Pc by mainly solving the following Equation (9):

$$Lv_c = -\lambda e \quad (9)$$

where L is an image Jacobian matrix, e is a deviation to be minimized by using visual servo, and $\lambda$ is a positive scalar to ensure stability.

As the method of visual servo control, there are a feature-quantity based method and a position-based method. First, the feature-quantity based method will be described.

Feature-Quantity Based Method

In the feature-quantity based method, when the coordinate of the feature quantity X on an image is represented by $[x, y]^T$, the image Jacobian matrix $L_x$ and deviation $e_x$ for the feature quantity X are expressed by the following Expression (10):

$$L_x = \begin{bmatrix} -1/Z & 0 & x/Z & xy & -(1+x^2) & y \\ 0 & -1/Z & y/Z & (1+y^2) & -xy & -x \end{bmatrix} \quad (10)$$

$$e_x = \begin{bmatrix} x - x^* \\ y - y_* \end{bmatrix}$$

where $[x^*, y^*]^T$ is the coordinate of the feature quantity X to target, and Z is a parameter to represent the depth. Although Z is an unknown value, the estimation method thereof is known, and furthermore, it is known that the stability of control is not likely to be impaired even when the accuracy is not so high. By using the augmented image Jacobian matrix L and the deviation e in which $L_x$ and $e_x$ are arranged in tandem by using a plurality of feature quantities, a pseudo-inverse matrix of the image Jacobian matrix L is obtained and the vector $v_c$ is calculated.

Position-Based Method

In the position-based method, the position and posture that become the targets of the control target point Pc are calculated from the image feature quantity, and the velocity and angular velocity of the control target point Pc to minimize the difference from the current position and posture are calculated. When it is assumed that the positional deviation is t and the postural deviation is R, the image Jacobian matrix L and the deviation e are expressed by the following Expression (11):

$$L = \begin{bmatrix} R & 0 \\ 0 & L_{\theta u} \end{bmatrix} \quad (11)$$

$$e = \begin{bmatrix} t \\ \theta_u \end{bmatrix}$$

$$L_{\theta u} = I_3 - \frac{\theta}{2}[u]_x + \left(1 - \frac{\sin c\, \theta}{\sin c^2 \frac{\theta}{2}}\right)[u]_x^2$$

where $\theta$ and u are vectors representing the postural deviation R by the rotation axis u and the rotation angle $\theta$, $I_3$ is a three-dimensional unit matrix, $[u]x$ is a cross-product matrix of u, and $\sin c(x) = \sin(x)/x$. The postural deviation R and the positional deviation t can be calculated by estimating a fundamental matrix or a homography matrix from the feature quantity.

The actuator controller 24 controls the actuator 14 so that, with the position of the control target point Pc at the next step received from the visual servo controller 27 as the target information, by calculating the optimal solution of a linear least-squares problem with a constraint condition as with the above-described first embodiment, the manipulator 10 is in a position and posture that satisfy the optimal solution.

As in the foregoing, in the second embodiment, the optimization problem is a problem of optimizing the operation of the actuator 14 with respect to the target operation of the control target point Pc in the visual servo control. According to the second embodiment, the control device 20B can cause the manipulator 10 to operate such that the control target point Pc moves to follow the target information obtained by the visual servo as much as possible while satisfying the constraint condition.

Third Embodiment

Figure 7:
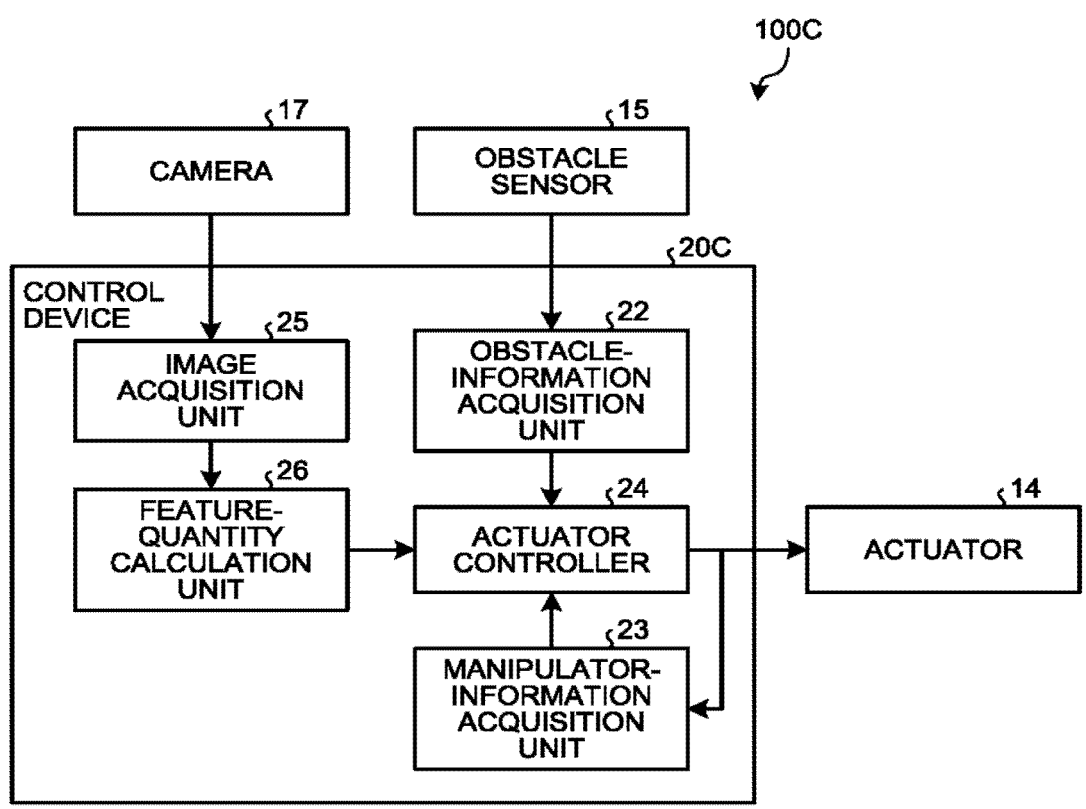
FIG. 7 is a schematic and exemplary block diagram of a control device according to a third embodiment.

FIG. 7 is a block diagram of a control device 20C according to a third embodiment. In a manipulator system 100C of the third embodiment, the control device 20C causes the control target point Pc to move to the target position by the visual servo control based on an image of the camera 17. However, the actuator controller 24 executes arithmetic processing including also the visual servo control while satisfying the constraint condition of interference avoidance, and controls the actuator 14 so as to operate in response to the arithmetic processing result. The actuator controller 24 executes a task by the visual servo control and a task by the interference avoidance control (constraint condition of interference avoidance). The task by the visual servo control is referred to as a visual servo task, and the task by the interference avoidance control is referred to as an interference avoidance task.

In the visual servo task, the actuator controller 24 calculates the vector $v_c$ indicating the velocity and acceleration of the control target point Pc by mainly solving the following Equation (9).

$$Lv_c = -\lambda e \qquad (9)$$

Thus, it is only necessary to derive the solution of a least squares problem that can be expressed by the following Expression (12).

$$\min_{v_c} \tfrac{1}{2}\|Lv_c + \lambda e\|^2 \qquad (12)$$

Accordingly, the actuator controller 24 calculates the optimal solution of a linear least-squares problem with a constraint condition as indicated by the following Expression (13).

$$\min_{\dot{q}} \tfrac{1}{2}\|J_c(q)\dot{q} - v_c\|^2 \; s.t.\; n^T J_B(q)\dot{q} \geq 0 \qquad (13)$$

That is, the actuator controller 24 can calculate the angular velocity of each joint 12 by solving the following Expression (14) for which the visual servo task and the interference avoidance task are considered:

$$\min_r \tfrac{1}{2}\left\| \begin{bmatrix} J_c^{(q)} & -1 \\ 0 & L \end{bmatrix} r - \begin{bmatrix} 0 \\ -\lambda e \end{bmatrix} \right\|^2 \qquad (14)$$

$$\text{s.t.} \; [\, J_s^{(q)} \; 0\, ]r \geq 0$$

$$r = \begin{bmatrix} \dot{q} \\ v_c \end{bmatrix}$$

where I is a unit matrix.

Furthermore, also in a case in which the visual servo task includes a first visual servo task as the constraint condition task, and a second visual servo task as the optimization task, and in which the constraint condition task further includes the interference avoidance task in addition to the first visual servo task, the actuator controller 24 can calculate the optimal solution that satisfies the constraint condition and control the actuator 14 so as to cause the manipulator 10 to execute the operation in accordance with the optimal solution. The constraint condition in the interference avoidance task is one example of the first constraint condition, and the constraint condition in the first visual servo task is one example of a second constraint condition.

Specifically, the actuator controller 24 assumes, as a constraint condition, the following Expression (15) for the first visual servo task:

$$L_1 v_c = -\lambda_1 e_1 \qquad (15)$$

where it is assumed that $L_1$ is a matrix of $1\times 6$ rows ($1<6$) and that there are a plurality of solutions that can achieve this task.

This first visual servo task can be obtained by the feature-quantity based method that tries to cause a certain feature quantity (coordinate [x, y]) to coincide with the target position (coordinate [x*, y*]). The first visual servo task is equivalent to solving the following Expression (16).

$$L_1 = \begin{bmatrix} -1/Z & 0 & x/Z & xy & -(1+x^2) & y \\ 0 & -1/Z & y/Z & (1+y^2) & -xy & -x \end{bmatrix} \qquad (16)$$

$$e_1 = \begin{bmatrix} x - x^* \\ y - y^* \end{bmatrix}$$

With the first visual servo task expressed by Expression (16), if the feature quantity is taken at the center of the target object and the target position is set to the center of the camera, the control in which the center of the target object is positioned at the center of the image of the camera 17 at all times is implemented, for example.

Furthermore, the actuator controller 24 obtains the optimal solution of the second visual servo task that can be expressed by the following Expression (17):

$$\min_{v_c} \tfrac{1}{2}\|L_2 v_c + \lambda_2 e_2\|^2 \qquad (17)$$

where an image Jacobian matrix $L_2$, a deviation $e_2$, and $L_{\theta u}$ are given by the following Expression (18).

$$L_2 = \begin{bmatrix} R & 0 \\ 0 & L_{\theta_u} \end{bmatrix} \qquad (18)$$

$$e_2 = \begin{bmatrix} t \\ \theta_u \end{bmatrix}$$

$$L_{\theta_u} = I_3 - \tfrac{\theta}{2}[u]_x + \left(1 - \tfrac{\sinc\theta}{\sinc^2\tfrac{\theta}{2}}\right)[u]_x^2$$

Accordingly, the actuator controller 24 can calculate, by solving the following Expression (19) having the interference avoidance task further added, the angular velocity of each joint 12 of the manipulator 10.

$$\min_r \tfrac{1}{2}\left\| \begin{bmatrix} J_c^{(q)} & -1 \\ 0 & L_2 \end{bmatrix} r - \begin{bmatrix} 0 \\ -\lambda_2 e_2 \end{bmatrix} \right\|^2 \qquad (19)$$

$$\text{s.t.} \; \begin{bmatrix} 0 & L_1 \\ J_s^{(q)} & 0 \end{bmatrix} r = -\lambda_1 e_1$$
$$\phantom{\text{s.t.}}\; \phantom{\begin{bmatrix} 0 & L_1 \\ J_s^{(q)} & 0 \end{bmatrix}} r \geq 0$$

$$r = \begin{bmatrix} \dot{q} \\ v_c \end{bmatrix}$$

With such a configuration, the control device 20C can cause the manipulator 10 to operate such that the control target point Pc moves to follow the second visual servo task as much as possible while assuming, as the constraint condition, the first visual servo task, and the interference avoidance task with the obstacle 30.

In the third embodiment, the optimization task has been the second visual servo task. However, the actuator controller 24 can solve a task in which the optimization task expressed by a least-squares problem or linear constraint and the interference avoidance task are incorporated. Specifically, the optimization task for the target information on the predetermined position and posture can be replaced with the above-described second visual servo task, for example.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manipulator system comprising:
a manipulator;
an actuator configured to operate the manipulator; and
a control device configured to control the actuator so that the manipulator moves while avoiding an obstacle, wherein
the control device controls the actuator so that an angle between a moving velocity vector of a first target point on the manipulator and a normal vector at a second target point on a surface of the obstacle is within 90°,
the manipulator is an articulated manipulator,
the actuator changes an angle between two arms rotatable coupled by a joint, and
the control device controls the actuator by, based on a Jacobian matrix at the first target point and the normal vector at the second target point on the surface, solving an optimization problem of a target operation of a control target point of the manipulator with a constraint condition including a first constraint condition in which an inner product of the moving velocity vector and the normal vector is 0 or more.

2. The manipulator system according to claim 1, wherein the optimization problem is a problem to optimize an operation of the actuator with respect to a predetermined target operation of the control target point.

3. The manipulator system according to claim 1, wherein the optimization problem is a problem to optimize an operation of the actuator with respect to a target operation of the control target point in visual servo control.

4. The manipulator system according to claim 1, wherein the constraint condition includes a second constraint condition by visual servo control of the control target point.

5. A control device included in the manipulator system according to claim 1.

6. A control method of a manipulator system that controls a manipulator by the control device according claim 5, the control method comprising:
acquiring the normal vector, and
controlling the actuator so that an angle between the moving velocity vector and the normal vector is within 90°.

7. A computer program product having a non-transitory computer readable medium including programmed instructions, wherein the instructions, when executed by a computer, cause the computer to function as the control device according to claim 5 to perform:
acquiring the normal vector, and
controlling the actuator so that an angle between the moving velocity vector and the normal vector is within 90°.

8. The manipulator system according to claim 1, wherein the Jacobian matrix is a matrix that represents a relation between a change in a joint angle of the manipulator, and a velocity and an angular velocity of the first target point on the manipulator.

* * * * *